३,६७१,३३१
COATED METAL AND METHOD
Irving Malkin, University Heights, Bert E. Palm, Mentor, Jon A. de Ridder, Ashtabula, and Victor V. Germano, Mentor-on-the-Lake, Ohio, assignors to Diamond Shamrock Corporation, Cleveland, Ohio
No Drawing. Continuation-in-part of application Ser. No. 729,918, May 17, 1968. This application Mar. 16, 1970, Ser. No. 20,085
Int. Cl. C23f 7/26
U.S. Cl. 148—6.2
25 Claims

ABSTRACT OF THE DISCLOSURE

A weldable, adherent coating provides enhanced corrosion protection for metal substrates as well as augmenting paint adhesion to such substrates. The coating is substantially resin-free and comprises a pulverulent metal in intimate mixture with the residue from a hexavalent-chromium-containing coating composition for metal substrates. The residue is water insoluble and is obtained by heating the substrate containing applied coating composition and also containing the pulverulent metal.

CROSS-REFERENCE TO RELATED APPLICATION

This application is a continuation-in-part of U.S. application Ser. No. 729,918, filed May 17, 1968, now abandoned.

BACKGROUND OF THE INVENTION

Hexavalent-chromium-containing coating compositions for metal substrates are applied to metal surfaces as liquid compositions containing hexavalent chromium, often supplied by chromic acid, to typically impart some corrosion resistance to metal surfaces. Such coatings have been shown for example, in British Pat. 1,033,399 and in U.S. Pats. 2,559,812, 2,768,104, 2,777,785, 2,846,342, 2,901,-385, 2,902,390, 3,063,877, 3,346,522, and 3,382,081. These coating compositions may contain some trivalent chromium, or the coatings can form trivalent chromium compounds during application and/or curing. Coatings thus prepared tend to be non-porous and somewhat amorphous in nature. They can provide initial, limited corrosion protection for the metal substrate, but under rigorous conditions or extended exposure to corrosive atmospheres, such protection is of undesirably short duration.

One method of upgrading the characteristics, e.g., visual appearance, of such a coating is by the addition of a resin or resin plus pigment. For example, U.S. Pat. 3,053,702 teaches an exemplary resin plus pigment composition for metal substrates. However, such a composition can exhibit retarded corrosion resistance and the resin can deleteriously affect weldability.

It would be highly desirable, for example in the automotive industry, to have a coating for metal which can be easily and economically applied which will offer corrosion resistance even after metal forming, and hence before welding. Thus such a coating needs to be highly adherent, must not deleteriously retard substrate weldability, and should afford galvanic protection, i.e., ability to impart corrosion resistance even when the coated metal is scratched to the substrate. Moreover, the general welding operation for high volume production lines is electrical resistance welding, which may typically be seam or spot welding, the specifications for which are most usually not met by coatings that would be readily fusion welded, e.g., arc welded. In addition, such desirable coatings must provide a suitable basecoat for subsequent painting even after metal forming and welding.

SUMMARY OF THE INVENTION

It has now been found that hexavalent-chromium-containing coating compositions for metal substrates can offer enhanced corrosion protection for such substrates when the residues obtained on the substrate from the curing of such compositions are in intimate mixture with a pulverulent metal. This corrosion protection is desirably extended to galvanic action as well as being exhibited after metal bending, e.g., as after forming. Additionally, the resulting coating augments adhesion for a paint subsequently applied over, and cured thereon. Moreover, where the substrate is a weldable metal substrate, such a coating provides for the retention of substrate weldability, even for electrical resistance welding.

Broadly, the present invention is directed in part to a coating composition preparing an adherent, water insoluble and corrosion resistant coating on a metal substrate, which coating is further substantially resin free. Before curing, the composition comprises an intimate mixture in liquid medium of a hexavalent-chromium-providing substance, 200–1,000 grams per liter of liquid medium of pulverulent metal, the composition having a weight ratio of chromium, expressed as $CrO_3$, to pulverulent metal of not substantially less than 0.08:1, and not substantially above about 5 weight percent based on the weight of pulverulent-metal-free composition, of especial agents. These agents are selected from the group consisting of dispersing agents, suspending agents, defoaming agents, wetting agents, extending agents, and mixtures thereof, and the above-mentioned pulverulent metal is selected from the group consisting of zinc, manganese, aluminum, magnesium, mixtures thereof, and alloys of same.

The invention is further directed to a coated metal substrate having on the surface thereof an adherent, corrosion resistant and substantially resin-free and water insoluble coating which coating comprises from about 50 to about 5,000 milligrams per square foot of pulverulent metal, from about 10 to about 500 milligrams per square foot of chromium, and contains a weight ratio of chromium to pulverulent metal not substantially above about 0.3:1. The invention is further directed to a method of preparing such a coated metal substrate and to the application of welding primers and/or electrodeposited paint thereto, and also relates to welding of metallic articles at least one of which before welding is a coated metallic article of the present invention.

For convenience the hexavalent-chromium-containing coating composition, that is, a liquid medium containing a hexavalent-chromium-providing substance is hereafter often referred to as simply the "coating composition."

It should also be understood that the "coating composition" further contains reducing agent for the hexavalent-chromium-providing substance unless such agent is to be added before curing of the composition. Also, the coating obtained after application and heating of such coating composition on the metal substrate is often referred to herein for convenience as a "residue."

DESCRIPTION OF THE PREFERRED EMBODIMENTS

The corrosion-resistant, hexavalent-chromium-containing coating compositions often contain chromic acid as the hexavalent-chromium-providing substance. But such chromium can be supplied by a salt such as ammonium dichromate, e.g., as taught in U.S. Pat. 2,846,342, or by sodium or potassium salts as shown in U.S. Pat. 2,559,812, or by substances such as calcium, barium, magnesium, zinc, cadmium, and strontium dichromate as shown for example in U.S. Pat. 2,901,385 and/or British Pat. 1,033,399. Additionally, the hexavalent-chromium-providing substance might be a mixed chromium compound, i.e., include trivalent chromium compounds as shown in U.S. Pat. 3185,596. Although the coating compositions might contain as little as about 0.25 weight percent of hexavalent chromium, expressed as $CrO_3$, and may contain as much as about 500 grams per liter of composition of hexavalent chromium, expressed as $CrO_3$, such compositions typically contain from a few weight percent up to about 100 grams per liter of hexavalent chromium, expressed as $CrO_3$.

In addition to a hexavalent-chromium-providing substance, these coating compositions contain a reducing compound which is typically a polyalcohol or organic acid and many of these useful reducing compounds have been shown for example in U.S. Pats. 2,559,812, 2,901,385, and 2,777,785. The reducing agent or component is usually present as a single compound which is often organic but can be an inorganic substance, such as potassium iodide, or a hypophosphite reducing agent as shown in U.S. Pat. 2,846,342. Organic reducing agents may be very low molecular weight agents such as formaldehyde, disclosed in U.S. Pat. 3,063,877 or such high molecular weight materials as polyacrylic acid compounds as taught in U.S. Pat. 3,185,596. The reducing agent can be the solution media of the coating composition, as shown in U.S. Pat. 2,927,046 and such reducing components may be preformed and stored prior to use, as taught for example in U.S. Pat. 3,346,522. The reducing agents may not be added to the coating composition directly, but rather supplied to a metal surface already containing an applied chromic acid solution, i.e., the agents are applied during drying of the chromic acid solution, on the metal surface as shown in U.S. Pat. 2,768,103. Combinations of reducing agents are disclosed, for example, the combination of succinic acid or other dicarboxylic acid of up to fourteen carbon atoms, in mixture with one another, or alone or as such mixtures in further mixture with one or more substances such as aspartic acid, acrylamide, succinimide, $C_4$–$C_{14}$ aliphatic ketocarboxylic acids, or $C_3$–$C_{18}$ unsaturated aliphatic carboxylic acids, as disclosed in U.S. Pat. 3,382,081.

Additional substances which may be included in such coating compositions, but in very minor amounts, include phosphoric acid or a compound of phosphorus, such as a metallic dihydrogen phosphate, and the phosphate can form part of the coating, as taught in U.S. Pat. 2,901,385. The total of phosphorus compounds should not be present in an amount substantially above about 15 grams per liter of composition so as not to deleteriously interfere with coating weldability or maintenance of metal particle integrity. For the phosphate-containing coating compositions, the tight adherent of the particulate metal to the metal substrate is virtually completely effected by the bonding ability of the chromium present in the coating composition.

Other useful compounds often found in hexavalent-chromium-containing coating compositions are maganese compounds which assist in extending the useful life of the coating bath, as desclosed in U.S. Pat. 2,777,785, or very minor amounts of pigment, e.g., those as disclosed in British Pat. 1,033,399, as well as resinous materials which have been shown in U.S. Pat. 3,346,522. However, the presence of more than very minor amounts of such materials, and especially such materials in combination, can deleteriously affect the coating integrity, e.g., with respect to weldability and galvanic protection. Thus for this invention such compositions should contain 0–40 grams per liter of resin, i.e., are substantially resin-free, contain 0–40 grams per liter of pigment, and 0–40 grams per liter of bath extending agents. Since the adherence for the particulate metal to the metal substrate is achieved by the chromium-providing-substance, such coating compositions are preferably resin-free, and such coatings that will be subsequently topcoated are preferably pigment-free.

Additional coating composition components may include a very limited amount of one or more organic and inorganic acids to maintain composition acidity as taught in British Pat. 972,072, as well as surface active agents, as are discussed more particularly hereinbelow. However, strong organic acids should be avoided as they can lead to a deleterious solution of the particulate metal, i.e., the particulate metal dissolves in the coating composition, losing its particulate integrity. To often additionally augment salt spray resistance of the coated substrate, such coating compositions can contain up to about 20 grams per liter of metallic ions, and typically between about 1–10 grams per liter of such ions. These metallic ions include calcium, ferrous, zinc, cobaltous, cupric, manganous, nickelous, and mixtures thereof. However, caution should be taken when introducing such ions into the dispersion to avoid the commensurate introduction of chloride and sulfate ions, since they can act to retard salt spray resistance.

Substantially all of the hexavalent-chromium-containing coating compositions are water based but other liquid materials are used, and typically these are alcohols, e.g., tertiary butyl alcohol, and this particular alcohol has been used in conjunction with high boiling hydrocarbon solvents to prepare the liquid medium for the coating composition, as taught in U.S. Pat. 2,927,046, or chlorinated solvents as taught in U.S. Pat. 3,437,531. In selection of the liquid medium, typically economy is of major importance, and thus such medium most always contains readily commercially available volatile liquids, i.e., liquids boiling at or below 100° C. at atmospheric pressure. Often the coating compositions are solutions but may be dispersions, e.g., contain a water dispersible reducing agent such as water dispersible polyacrylic acid compounds.

The metals for the pulverulent metal may be referred to as the less noble metals, i.e., magnesium aluminum, manganese, and zinc, as well as their alloys, e.g., zinciferous and aluminiferous metals, and additionally include mixtures of any such metals. Preferably, for efficiency and economy, such metal is zinc, or aluminum, or their mixtures. Moreover, for most readily achieving enhanced corrosion protection by the less noble pulverulent metals, the metals of the substrate are advantageously metals from copper through zinc, inclusive, on the electromotive force series, as well as alloy of such metals wherein such metals are present in major amount, but virtually always these metals are copper, lead, tin, nickel, cobalt, and chromium when other other than a ferrous metal substrate. Preferably for weldability, as well as economy, the substrate is a ferrous metal substrate such as iron, stainless steel, or steel such as cold rolled steel or hot rolled and pickled steel.

The pulverulent metal can be flake, or powder, or both but should have particle size such that all particles pass 100 mesh and a major amount pass 325 mesh ("mesh" as used herein is U.S. Standard Sieve Series). Advantageously, for preparing a coated substrate having augmented uniformity in the distribution of the pulverulent metal, as well as enhanced bonding of metal to the substrate, the pulverulent metal employed is one wherein essentially all particles, e.g., 80 weight percent or more, pass 325 mesh. Within the range discussed herein, the desired amount of pulverulent metal present on the substrate surface may be a function of the average particle size of such metal. Thus, for best paint adhesion, the more coarse powders, i.e., those having average particle size approaching 5 microns and more, are employed in greater amounts than pulverulent metals having average particle size approaching one micron.

When the metal is to be applied to the substrate as a dispersion of pulverulent metal in liquid medium, the dispersion can contain up to, for example, about 10 percent by volume of a surface active agent, but generally contains a few percent or less. Typically, the surface active agents present in such a dispersion include dispersing agents, suspending agents, defoaming agents, and wetting agents and these are referred to herein for convenience simply as surface active agents. When the pulverulent metal is present in the coating composition, i.e., the composition containing the hexavalent-chromium-providing substance, such composition preferably for efficiency and economy does not contain substantially above about 5 weight percent, basis weight of the pulverulent-metal-free composition, of the surface active agent. Also, if such agent is present, it may be used in an amount of as little as 0.001 weight percent.

Such agent may typically be a hydroxyl-containing hydrocarbon ether which includes the alkyl ethers of alkylene glycols, such as butyl ether or propylene glycol, the oxyalkyl ethers of alkylene glycols, e.g., 1-butoxyethoxy-2-propanol, fatty alcohol polyoxyalkylethers, alkylphenol polyoxyalkylethers such as polyoxyethylated nonylphenols, and polyalkylene glycols, e.g., tetraethylene glycol. Other suitable surface active agents which may be used include products prepared from waste sulfite liquors such as lignin sulfonic acids and products from pine wood distillation, e.g., pine oil.

When the pulverulent metal is present in the coating composition, the composition should be made up with an amount of such metal sufficient to supply between about 200–1,000 grams of the metal per liter of coating composition liquid medium. The presence of less than about 200 grams per liter of the metal will not provide a desirable enhancement in the corrosion protection achieved with the coating composition, for example in a typical single coating with the composition on a substrate as obtained by an economical and efficient roll coating of a substrate strip. The presence of greater than about 1000 grams per liter of pulverulent metal is undesirable, for example, can add expense without a significant increase in corrosion protection for the coated substrate.

Also, for such pulverulent metal containing coating compositions, the chromium, expressed as $CrO_3$, should not exceed more than about 200 grams per liter of composition medium. Greater than about 200 grams per liter of chromium is uneconomical and can deleteriously detract from the characteristics of the coated metal surface, for example, the most desirable corrosion resistance for the coated metal substrate. Further, such composition should have a weight ratio of chromium, expressed as $CrO_3$, to pulverulent metal within the range of about 0.08:1 to 0.4:1, for the compositions of lesser concentration, as explained more fully hereinbelow.

A ratio of less than about 0.08:1 may not provide sufficient chromium in the coating to achieve augmented bonding of the pulverulent metal to the metal substrate. A ratio of greater than about 0.4:1 may detract from the most enhanced corrosion resistance for the coated substrate. Thus for a composition for example containing about 200 grams per liter of metal, chromium should be present in the composition in an amount between about 15–80 grams per liter of coating composition. However, when the concentration of pulverulent metal exceeds about 500 grams per liter, the weight ratio of chromium, expressed as $CrO_3$, to pulverulent metal of about 0.08:1 may be maintained but the amount of chromium should not be above about 200 grams per liter, as discussed hereinabove. Thus, for example, at 1000 grams per liter of pulverulent metal, the weight ratio of chromium, expressed as $CrO_3$, to pulverulent metal will be below about 0.2:1. It has been found that these very concentrated coating compositions containing between about 500–1000 grams per liter of pulverulent metal have particular utility in the coating of small parts as opposed to application to large substrate areas such as metal coils. Typically, the compositions containing pulverulent metal have above about 30 grams per liter of liquid medium of chromium, expressed as $CrO_3$, and below about 100 grams per liter of chromium.

Often the coating ingredients are combined into separate packages one of which contains the hexavalent-chromium-providing substance along with the reducing agent for such substance, in a liquid medium, and the other package being a dispersion in liquid medium of pulverulent metal which package may additionally contain some surface active agent. Such separate packages may be blended together before application to the metal substrate or may be separately or simultaneously applied.

These coating compositions are usually applied to a metal surface either by dipping the article into the coating composition or by spraying the composition onto the metal surface, which surface can be a preheated metal surface to assist in the curing of the coating, as taught in U.S. Pat. 2,846,342. However, the coating composition may be used as an electrolytic bath to coat a metal surface employed as a cathode in the bath, as shown in British Pat. 972,072. The coating composition may be applied to the metal surface after an etch, e.g., a nitric acid etch, as taught in U.S. Pat. 2,768,103, or the reducing agent may be applied after the application of the hexavalent-chromium-containing solution and during drying of such solution on the metal surface, as mentioned hereinabove. The coating composition may be applied from a heated bath, for example one heated up to 200° F. as taught in U.S. Pat. 2,768,104. Moreover, after application and curing of the composition the heated metal may be desirably quenched, as in a solution of chromic acid in water as taught in U.S. Pat. 2,777,785.

The pulverulent metal can be applied dry to the metal substrate, for example by simply brushing or blasting the metal onto the substrate, or by electrostatic spraying. The pulverulent metal can also be applied to the metal substrate as a dispersion in liquid medium, for example as discussed hereinbefore. For economy such dispersions advantageously contain at least about 5 grams per liter of dispersed metal to avoid subsequent uneconomical evaporation of large amounts of volatile liquid. However, the dispersions may contain above 90 weight percent of pulverulent metal in the case of a dense metal such as zinc, i.e., up to 65 volume percent of such metal. Such dispersions can be applied to the metal substrate by any conventional method for coating a substrate with a liquid, for example, dip coating, roller coating, or reverse roller coating, curtain coating, airless spray, rotary brush coating, pressure spray, or combinations of such techniques as for example, spray and brush techniques. However, for usual spray application, the concentration of pulverulent metal in the dispersion for a dense metal such as zinc does not exceed about 500 grams per liter.

When applied in dry form or as a dispersion in liquid medium, the pulverulent metal may be applied before or after the application of the coating composition, so long as such composition has not been cured. When the coating composition is applied electrolytically, the pulverulent metal is preferably applied thereafter to avoid loss of such metal in the electrolytic bath. Where the pulverulent metal is dispersed in a liquid medium and it is desired to dry such dispersion on the surface during, or after application thereto, it is preferably forced dried, for example at an attained metal substrate temperature typically up to about 200° F. Also, as has been taught in U.S. Pat. 2,846,342, mentioned hereinbefore, an elevated substrate temperature to obtain fast curing may be achieved prior to, and maintained during, application of the coating composition. Such fast curing can be employed during application of the coating composition so long as the pulverulent metal is present on the substrate before, or is applied in mixture with, or simultaneously with, the application of the coating composition.

The resulting coating weights on the metal substrate may vary to a considerable degree but, exclusive of the pulverulent metal, the residue should contain not substantially below about 10 milligrams per square foot of chromium, expressed as chromium and not $CrO_3$. Less than about 10 milligrams per square foot of chromium can be insufficient to desirably bond or "cement" the pulverulent metal to the substrate. Furthermore, residues containing below about 35 milligrams per square foot of chromium, expressed as chromium and not $CrO_3$, should be topcoated to impart significant enhancement to corrosion resistance of the coated substrate. Also if the coated metal substrate is to be subsequently formed, the residue should contain not substantially above about 120 milligrams per square foot of chromium as the coating may be subjected to cracking or crazing during forming operation, although for typically finished products when subsequent forming is not contemplated, and extended corrosion resistance without topcoating may be desirable, such residue may contain up to about 500 milligrams per square foot of chromium. Most usually for metal which will be subsequently topcoated the residue contains between about 20–40 milligrams per square foot of chromium and coatings which are not intended to be topcoated will typically contain in the residue about 40–100 milligrams per square foot of chromium.

A subsequent paint topcoating is also a consideration for the amount of pulverulent metal that should be present on the surface of the substrate in the coating residue. Such residue should not contain less than about 50 milligrams per square foot of pulverulent metal for imparting significant enhancement in the corrosion resistance to the substrate and where such substrates are not intended to be subsequently topcoated the residue should not contain substantially less than about 200 milligrams per square foot of pulverulent metal. However, subsequently topcoated residues can contain substantially more pulverulent metal, such as 600–700 milligrams per square foot of such metal. Also where such substrates will not be subsequently topcoated the substrate may contain up to about 5,000 milligrams per square foot of pulverulent metal, whereas an excess of that amount is usually uneconomical and may provide problems in sufficient bonding of the pulverulent metal to the coated substrate.

It can be appreciated that the present invention is directed to coating compositions and resulting coatings wherein there is a very substantial excess of pulverulent metal to chromium even for the lesser concentrations of the pulverulent metal. It can be said that generally the coating should have a weight ratio of chromium, expressed as chromium and not $CrO_3$, to pulverulent metal of less than about 0.3:1 and further that such ratio is most usually for the less heavy coating weights, since as the coating weights approach, for example, 5000 milligrams per square foot of pulverulent metal, the weight ratio of chromium to pulverulent metal will be less than about 0.2:1. It has also been found that for coil coating, the weight ratio of chromium, expressed as chromium and not $CrO_3$, to pulverulent metal will preferably be in the range of between about 0.15–0.04:1 for economy and efficiency with the weight for the coating residue not being substantially above about 1000–1500 milligrams per square foot of coated substrate. For coating small parts, i.e., parts smaller than coils, which can be final products that will not be normally subjected to subsequent forming, and where coating weights may approach 5000 milligrams per square foot of pulverulent metal, the weight ratio of chromium to pulverulent metal in the coating may be as low as about 0.02:1.

After application to a metal substrate, the preferred temperature range for the subsequent heating, which is also often referred to as curing and which may be preceded by drying such as air drying, is from about 200° F., as taught for example in U.S. Pat. 3,185,596, but more typically from about 212° F. at a pressure of 760 mm. Hg, up to about 1,000° F. Such an elevated substrate temperature may be attained by preheating the metal prior to application of the coating composition as shown in U.S. Pat. 2,846,342. However, such curing temperatures do not often exceed a temperature within the range of about 450°–900° F. at the elevated curing temperatures the heating can be carried out in a fraction of a second, e.g., as rapidly as about 0.25 second or less, but is generally conducted for a slightly longer time, such as about one minute at a reduced temperature to provide the most corrosion-resistant and adherent coatings.

The coating composition is further of particular interest as a base coating or primer coating on a metal substrate which is subsequently topcoated with a "weldable primer" containing an electrically conductive pigment in a vehicle, as more particularly discussed hereinbelow. It has been found that when such coating compositions are applied to a metal substrate and subsequently topcoated with a weldable primer, but the coating composition does not contain pulverulent metal, desirably extended electrical resistance welding of the coated substrate may not be achieved. More particularly, when such particulate metal-free, hexavalent-chromium-containing coating composition is applied to a metal substrate in amounts sufficient to supply above about 25 milligrams per square foot of chromium, expressed as chromium and not as $CrO_3$, and this coated substrate is further coated with a welding primer, electrical resistance welding of such substrate can be severely retarded. It has now been found that the coating compositions of the present invention overcome this welding problem, and that typical composition residues containing 40–50 milligrams per square foot of chromium can be subsequently topcoated, and still provide excellent, extended electrical resistance welding.

Generally, in coating a substrate before welding first with the coating composition and then with a weldable primer, the total coating thickness on the substrate should not exceed 1.0 mil. Preferably, for economy, the total coating thickness is about 0.5 mil or less and the welding primer advantageously supplies the major amount of such film for further economy, for example, 80–90 percent of the thickness of such film. If welding of such substrate is not a factor, and, for example, excellent corrosion resistance of such two-coat system is sought, the weldable primer may be applied in substantially greater amounts to provide films many times more thick than one mil.

More particularly, the welding primers are coating compositions containing a particulate, electrically conductive pigment of aluminum, copper, cadmium, steel, carbon, zinc, or magnetite, i.e., the magnetic oxide of iron, and including mixtures thereof such as of aluminum flake and zinc powder. Generally, the carbon pigments, e.g., channel blacks or furnace blacks, are the most finely divided of these electrically conductive pigments, often having particle size of 0.01 micron for the intensely black pigments. Comparatively, the finely divided aluminum powders have flake thicknesses for the finest grades of about 0.25 micron. These aluminum pigments can be typically produced by stamping, generally of small pieces of aluminum foil, or by ball milling atomized aluminum formed by air blasting a molten aluminum spray. Typically a finely divided zinc pigment is a distilled zinc dust or particles prepared by atomizing molten zinc in an air stream. Particle size for distilled zinc powders often average from about 2 to about 6 microns with generally about 99 weight percent or better passing a 240 mesh U.S. Standard Sieve.

Since these primers generally are applied preparatory to subsequent welding of the substrate, they must contain a substantial amount of the electrically conductive pigment, e.g., at least about 30 volume percent pigment for the zinc-rich primers and often more than about 65 percent by volume of particulate pigment, but on a weight basis, because of the density of the zinc, these primers can contain up to about 98 weight percent of such pigment.

In formulating the weldable primers, the binder component can be made up of resins specially selected to afford particular characteristics to the applied coating. Thus the binder components for the zinc-rich primer having the greatest adhesion are polyamide resins combined with epoxy resins, although other binder materials have been found to be compatible with particulate zinc pigment, e.g., polystyrene, chlorinated or isomerized rubber, polyvinyl acetate and polyvinyl chloride-polyvinyl acetate copolymers, alkyd/melamine, and epoxy esters including epoxy ester medium oil content linseed oil. Additionally the formulations can contain flow control agents, as for example urea formaldehyde resins, thixotroping agents such as silica and organic derivatives of magnesium montmorillonite, and anti-settling agents particularly for the aluminum and zinc primers, which agents include hydrogenated castor oil and aluminum stearate. Also for the aluminum and zinc primers where gassing can be a problem a gas inhibiting substance such as lime or calcium oxide is generally included in the formulation. Also, these primers usually contain, and/or are typically cut back after formulation but before application with, petroleum derived hydrocarbon liquids such as toluene, benzene, xylene, and synthetically prepared aromatic solvent blends from petroleum. Zinc-rich weldable primers have been more extensively reviewed in an article entitled "Zinc-Rich Paints" in Paint and Varnish Production, April 1964, p. 35f.; May 1964, p. 87f.; and June 1964, p. 47f.

The final make up of the primer can be dependent upon the method of application of the primer to the treated metal substrate. Typically for primers containing zinc dust or combinations of zinc dust with aluminum flake, or zinc flake with aluminum flake and the like, where such primers are spray applied to the metal substrate they may contain between about 50–80 weight percent of the pulverulent metal and between about 10–30 weight percent of binder. Also such primers generally are formulated with a few weight percent or less of a thixotroping agent, and often with a half weight percent or less of a metallic drier, e.g., a lead, manganese, cobalt or other metallic salt of organic acid, and typically 10–30 weight percent of petroleum derived hydrocarbon liquid.

However, for such primers which are electrically deposited, they typically contain, based on the weight of the total paint solids, 40–65 weight percent of electrically conductive pigment, e.g., zinc flake or combinations of zinc and aluminum flake, as well as 20–40 weight percent binder plus 5–25 weight percent of one or more extender pigments. However, on a basis of the overall coating bath, such electrodeposited primers can typically contain greater than about 80 weight percent of water medium supplied by deionized water to avoid any reactions between the electrically conductive pigment and water. Additionally, in the overall coating bath, there is usually present in very minor amounts, e.g., a half percent or less, a pigment dispersing agent, such as a metallic stearate, a comparable amount of surfactant, as well as slightly greater amounts of organic solvent, supplied for example by a petroleum distillate.

For these electrically deposited primers, the extender pigment, e.g., rutile or anatase titanium dioxide, zinc oxide, leaded zinc oxide or the like, is included to enhance the uniformity of the deposited primer film. Also, the binders used for such electrodeposited primers are preferably high resistance type resins, thereby permitting the presence of enhanced amounts of extender pigment in the primer formulation. For electrodeposition, such primers are typically coated onto copper, cupriferous, zinciferous, or ferrous metal substrates.

The primer can also be applied to the treated substrate by other various methods, e.g., any of the methods which may be used for application of the hexavalent-chromium-containing coating composition to the substrate, and which have been mentioned hereinabove in connection with the application of pulverulent metal dispersions to a substrate. Generally to achieve a significant enhancement in augmenting corrosion resistance, the applied primer has a film thickness in excess of about 0.05 mil, but for economy, has a film thickness not substantially in excess of about 6 mils.

The primer is preferably applied to a treated substrate which has first been cooled to a temperature below about 200° F. after curing of the applied liquid composition, since substrate temperatures above about 200° F. may cause excessively rapid evaporation of the volatile compenents in the primer composition which can result in a discontinuous, applied film.

After application the primer is cured, which can often be accomplished simply by air drying at room temperature or by accelerated air drying at an elevated temperature such as 200° F. or higher. Additionally, such drying can be enhanced by catalytic action for example with a metallic drier including lead, manganese, and cobalt or other metallic salts of organic acids, e.g., cobalt acetate. Such primers as are cured at room temperature by air drying can be ostensibly dry to the touch in as quickly as 10–12 minutes. Many of the weldable primers, e.g., those based on epoxy resin or epoxy/melamine resins for the binder component, are cured at an elevated temperature and for a period of time sufficient to vaporize volatile composition substituents, with the baking temperature being dependent upon the applied film thickness as well as on the particular binder present in the formulation.

For baking, a simple convection oven is preferred as opposed to infrared baking, since the capacity of the zinc and aluminum primers to reflect infrared radiation can lead to inefficient operation. Advantageously, for primers cured at elevated temperatures, they are baked at a temperature within the range of between about 350–1000° F. for a time of about 0.5–10 minutes. Temperatures below about 350° F. and times of less than about 0.5 minute can provide incomplete baking which, especially on mill finished coils, may lead to deleterious film removal, e.g., during coiling. Temperatures above about 1000° F. can lead to film degradation, e.g., charring of the binder solids, and baking times of greater than about 10 minutes are usually uneconomical. Typically, a zinc-rich primer having an applied film thickness of between about 0.1–3 mils is baked in an oven having an ambient air temperature of about 400°–700° F. and for a time of about 0.5–5 minutes.

The coating composition residue and such residue also which is further topcoated with a weldable primer may also form a particularly suitable substrate for paint deposition by electrocoating. This application may be used with metal substrates as well as other substrates, e.g., polysulfones and other synthetic polymer surfaces, which can withstand curing of the applied coating composition, typically at a temperature as low as about 300° F. or less for compositions in a t-butyl alcohol medium, or a more elevated temperature cure of 350°–400° F., or more, for compositions in aqueous medium.

The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

Of particular interest are polycarboxylic acid resins which can be solubilized with polyfunctional amino compounds and include the siccative oil-modified polybasic acids, esters or anhydrides which can be further reacted with divinyl benzene for example or acrylic acid and esters as well as polymerizable vinyl monomers. Such mention of suitable baths for electrodeposition is made herein by way of example and should not be construed as limiting. More exhaustive discussions of such film-forming systems have been set forth, for example, in U.S. Pats. 3,304,250 and 3,455,805.

Also, substances of particular interest, for example in the automotive industry, are the anodically deposited film-forming materials which have gained considerable acceptance in this field and are exemplified by U.S. Pat. 3,230,162. However, the broad scope to which the electrodeposition of film-forming materials relates, includes the deposition of such materials on anodic or cathodic substrates, and by means of various techniques for passage of current through a bath, including even intermittent pulsed current.

Before starting the treatment of the present invention it is, in most cases advisable to remove foreign matter from the metal surface by thoroughly cleaning and degreasing. Degreasing may be accomplished with known agents, for instance, with agents containing sodium metasilicate, caustic soda, carbon tetrachloride, trichlorethylene, and the like. The use of a commercial alkaline cleaning composition which combines washing and mild abrasive treatments can be employed for cleaning, e.g., an aqueous trisodium phosphate-sodium hydroxide cleaning solution. In addition to cleaning, the substrate can undergo cleaning plus etching, for example, with a hydrofluoric acid etching agent.

After coating by any of the methods of the present invention, the resulting coated substrate can be further topcoated with any suitable paint, i.e., a paint, primer, enamel, varnish, or lacquer. Such paints may contain pigment in a binder or can be unpigmented, e.g., generally cellulose lacquers, rosin varnishes, and oleoresinous varnishes, as for example tung oil varnish. The paints can be solvent reduced or they may be water reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxys, acrylics, vinyl, including polyvinyl butyral and oil-wax-type coatings such as linseed oil-paraffin wax paints. The paints may be applied as mill finishes.

The following examples show ways in which the invention has been practiced but should not be construed as limiting the invention. In the examples the following procedures have been employed.

PREPARATION OF TEST PANELS

Steel test panels (4" x 12", or 4" x 6 " unless otherwise specified, and all being cold rolled, low carbon steel panels) are typically prepared for subsequent treatment by immersing in water, or by spraying with water, which has incorporated therein 2–5 ounces of cleaning solution per gallon of water. The cleaning solution is typically 25% by weight of tetrasodium pyrophosphate, 25% by weight of disodium phosphate, and the balance sodium hydroxide, or such a cleaning solution as 25 weight percent tripotassium phosphate and 75 weight percent potassium hydroxide. The bath is maintained at a temperature of about 150°–180° F. After this cleaning, the panels can be scrubbed with a brush or a dry cleaning pad which is a porous, fibrous pad of synthetic fiber impregnated with abrasive. Following the cleaning, or cleaning plus scrubbing, the panels are rinsed with warm water.

CORROSION RESISTANCE TEST (ASTM B–117–64)

Corrosion resistance of coated panels is measured by means of the standard salt spray (fog) test for paints and varnishes, ASTM B–117–64. In this test, the panels are placed in a chamber kept at constant temperature where they are exposed to a fine spray (fog) of a 5% salt solution for specified periods of time, rinsed in water and dried. The extent of corrosion on the test panels are then compared one with the other by visual inspection. Where test panels are scribed, the scribing is done by cutting an "X" configuration on the face of the panel, the scribe lines being made through the coatings to expose the underlying metal. The extent of corrosion along the scribe lines is also made by visual inspection and through comparison among test panels.

COIN ADHESION

A freshly minted, i.e., uncirculated, nickel coin is firmly held in vise-grip pliers; the pliers are manually held in a position such that a portion of the rim of the nickel coin contacts the coated substrate at about a 45° angle. The nickel coin is then drawn down across the panel for about two inches. The type of coating flaking and/or chipping is evaluated qualitatively by visual observance, and panels are compared with the condition of a standard test panel.

CONDENSING HUMIDITY TEST

In this test water is heated in the bottom of a cabinet to produce a condition of 100 percent humidity in the cabinet and a temperature for the ambient steam within the cabinet of 120° F. Panels are placed in the cabinet at about a 15° angle to the water surface; the bottom edge of the panel is about 8 inches above the water surface, and the top edge about 10 inches above the water surface. To terminate the test, panels are removed for inspection at the times shown in the table below. Upon removal, panels are air dried and visually inspected for blisters and pinhole rust spots on the face of the panel, that is, not around the panel edges. Results are reported as that portion of the total panel face, in percent, which exhibits red rust and blister coating failure.

PANEL BENDING—90° AND 180° BEND

Unless otherwise specified in the examples, the panel bending, where corrosion resistance of coated panels is tested at a bend, is a 90° bend. This bend is obtained by manually grasping a test panel at the opposing edges of shortest dimension and then manually bending the panel over the edge of a flat surface, such as the edge of a table, with the panel being typically positioned at such edge to obtain the bend at approximately the midsection of the panel. The bending is continued until the panel, by visual inspection, is viewed to have a bend of approximately 90°, or is removed from the edge and the bending continued until the panel is viewed to have a bend of about 180°.

Example 1

Test panels are prepared as described above and are coated with a coating composition as disclosed in U.S. Pat. 3,382,081, and containing 40 g./l. (grams per liter) of $CrO_3$, 15 g./l. of succinic acid, 7.5 g./l. of succinimide, and 0.5 g./l. of polyoxyethylated nonylphenol which composition is referred to hereinafter as the "C/S" composition. The panels are coated by dipping into this coating composition, removing and draining excess composition from the panel, and air drying at room temperature until the coating is dry to the touch, unless otherwise noted in the table below.

Three zinc dust spray dispersions are prepared each containing 0.3 g./l. of lignin sulfonic acid dispersing agent, and either 50 g./l., or 75 g./l., or 200 g./l. of zinc dust, as shown in Table 1 below. These dispersions are sprayed onto coated panels with a DeVilbiss paint spray gun (Type JGC 502) calibrated to deliver 1–3 milliliters of water in 5 seconds at 35 lbs. air pressure per square inch. Achieved coating weights for the zinc, in milligrams per square foot of panel surface, are also shown in the table, along with the average particle size of the zinc. After application of this pulverulent zinc all panels, containing dry or moist coating composition, as shown in Table 1 below, plus zinc dust, are baked under infrared lamps at a substrate temperature up to 450° F. for a time up to one minute.

In the table below, results are also reported for panels coated only with the C/S composition, and hence free from zinc dust, which panels are identified in the table as the "Standard A" panels. Also, comparative panels are coated only with a chromic acid/adipic acid/succinimide composition having these substituents in the following amounts respectively, in g./l., 40:20:10. These panels are also free from zinc dust and are identified in the table below as the "Standard B" panels. These pulverulent-metal-free panels are included as a basis for comparison with the pulverulent-zinc-containing panels and are coated and the coatings cured in the manner described hereinabove. As indicated in the table below, some of these comparative panels and some of the zinc-containing panels are coated with an alkyd enamel, and the resulting coatings cured, as described hereinbelow.

The alkyd enamel is a commercial white alkyd enamel topcoat typically applied by dip-coating panels into the enamel. This paint is prepared from a modified alkyd resin based upon a system of partially polymerized phthalic acid and glycerine. The paint contains 50 weight percent solids and has a viscosity of 50 seconds as measured on a No. 4 Ford cup at 70° F. After coating panels with the enamel, the coating is cured by baking in a convection oven for 20 minutes at a temperature of 320–325° F.

In Table 1, results are reported for the condensing humidity test as well as for the coin adhesion test and the corrosion resistance (salt spray) test, each of which has been described hereinbefore.

TABLE 1

| Zinc dust | | | | | | |
|---|---|---|---|---|---|---|
| Average particle size | Spray conc., g./l. | Weight on panel, mg./sq. ft. | Topcoating | Coin adhesion | Condensing humidity | Salt spray |
| None—Standard A Panel | | | Alkyd | Fair | | |
| | | | None | | 24 hrs., 2-3% | |
| None—Standard B Panel | | | Alkyd | Fair | | 91.5 hrs.—5%. |
| | | | None | | 3 hrs., incipient, trace failure | |
| 1.63 | 50 | 60 | Alkyd | Good | | |
| 2.9 | 200 | ¹ 50 | do | Good-excellent | | |
| 2.9 | 200 | 50 | do | do | | |
| 2.9 | 200 | 120 | do | Excellent | | |
| 2.9 | 200 | 240 | do | do | | |
| 1.63 | 50 | 100 | None | | {80 hrs.—1% / 504 hrs.—10 to 12%} | |
| 2.9 | 200 | ¹ 50 | do | | 112 hrs.—2% | |
| 2.9 | 200 | 50 | do | | 112 hrs., less than 1% | |
| 1.63 | 175 | 50 | do | | | 65 hrs.—3%. |
| 2.9 | 200 | 80 | do | | | 112 hrs., less than 1%. |
| 2.9 | 200 | 150 | do | | | 112 hrs.—0%. |
| 2.9 | 200 | 220 | do | | 690 hrs.—2% | |

¹ Zinc dust applied while coating composition still moist.

The above results clearly show the superior topcoat adhesion obtained for the pulverulent-metal containing coating compositions. Additionally, such compositions exhibit enhanced corrosion resistance as determined by the condensing humidity test even for pulverulent metal weights on test panels of as little as 50 milligrams per square foot. Such a small amount of the pulverulent zinc can also provide good corrosion resistance as determined by the salt spray test whereas slightly greater amounts, e.g., 80 milligrams per square foot of panel surface, achieves additionally augmented corrosion resistance as determined by such test, even when compared with the alkyd-topcoated, chromic acid/adipic acid/succinimide composition which affords desirable corrosion protection in salt spray testing.

Additional panels, prepared as described hereinabove with the C/S composition are, while still wet, coated in the above-described manner to contain 200 milligrams per square foot of zinc dust having an average particle size of 2.9 microns. These panels are then cured in the above-described manner and are subjected to electrical resistance spot welding. The welding is performed with Class 2 copper electrodes at an electrode pressure of 550 pounds using a weld time of 12 cycles based on a 60 cycle frequency and at a weld heat of 12,000 amp-sec. During such welding, the welded substrate pulls an acceptable "button" in the peel test.

In this peel test, two coupons (panels) which have been welded together by at least one spot weld are peeled apart past the weld, thereby tearing the welded spot from one of the coupons. Hence, one coupon has a hole at the place of the spot weld and the other coupon has a "button" of metal, at the place of the spot weld. The electrodes for the welding are circular and have a diameter of 0.250 inch. The buttons pulled from the initial test coupons, measured across their narrowest apparent diameter with a micrometer caliper calibrated for measuring to the nearest 0.001 inch, must be virtually 0.250 inch across. Additionally, buttons measured in the same manner as the test approaches 2,000 spot welds must measure at least 0.220 inch across. In view of the pulling of acceptable buttons to the 2,000 spot weld such panels are considered to be highly suitable for the electrical resistance spot welding.

Example 2

Test formulations are prepared, but some are representative of compositions from the prior art and are employed herein for comparative purposes. Initially, a coating composition is prepared in accordance with Example 5 of U.S. Pat. 2,846,342 by blending together 20 g./l. of $CrO_3$, 5 g./l. ethylene glycol, 10 g./l. of zinc dihydrogen phosphate, and 965 grams of water. One panel (Panel A) is coated with this composition by dipping the panel into the composition, draining excess composition from the panel, air drying at room temperature and then baking the composition in an oven at an oven temperature of 360° F. and for 3 minutes to obtain a water insoluble coating. This panel is water quenched and is prepared for comparative purposes.

The above compoistion is again prepared but is formulated to include 200 g./l. of powdered zinc having an average particle size of 3 microns and 5 grams per liter of a dispersion of nonionic, water soluble ether of cellulose having a viscosity of 4200–4700 cps. at 25° C. as measured on a Brookfield viscometer with a Number 4 spindle at 60 r.p.m. A panel (Panel B) is coated by dipping into same, removing and draining excess composition from the panel, and air drying at room temperature followed by the same baking and quenching as for Panel A. This panel is prepared in accordance with principles of this invention, but contains a total coating weight of about 150–200 mgs. per sq. ft.

An additional panel (Panel C) for comparative purposes is prepared in part in line with the teachings of U.S. Pat. 3,462,319. In accordance with the teachings of Example 1 of that patent, with the change of powdered zinc replacing titanium oxide, a coating solution is prepared to contain 4 percent $CrO_3$, 4 percent phosphoric acid, 30 percent powdered zinc having an average particle size of 3 microns, and 62 percent distilled water. When the zinc has dissolved, as indicated by the cessation of gassing, a panel is coated by dipping into the solution, removing the panel and draining excess composition from the panel, and then, in line with precepts of the present invention, the panel is heated in a convection oven for 5 minutes thereby achieving a metal temperature of 450° F. and preparing a panel having a coating weight of about 350 milligrams per square foot. This panel is prepared for comparative purposes.

As shown in Table 2 below panels are bent 180° before testing in the manner described hereinbefore, and Panel C is scribed before testing in the manner also above described. All panels are then subjected to the above described salt spray test for a time as shown in the table and the figures presented in the table are for percentage of red rust on the panel, that is, at the bend or at the scribe or on flat exposed surface, as shown in the table, for the duration of the test time shown.

TABLE 2

| Panel | Zinc | Salt spray results | | |
|---|---|---|---|---|
| | | Bend | Scribe | Flat surface |
| A-comp | No | 90%—2 hrs | N.S. | 100%—14 hrs. |
| B | Yes | 75%—21 hrs | N.S. | 50%—21 hrs. |
| C-comp | Yes | 90%—27 hrs | 100%—27 hrs | 30%—27 hrs.[1] |

[1] Average of 2 panels.
NOTE.—Comp.=Comparative panel. N.S.=No scribe.

The above results show that the comparative Panel A offers virtually no corrosion resistance. The zinc containing Panel B provides for 50 percent or more reduction in corrosion as compared with the Panel A. However, at a total coating weight of about 150–200 mgs. per sq. ft. and hence less than 200 mgs. per sq. ft. of powdered metal, such coating should be topcoated for achieving desirably extended corrosion protection.

Comparative Panel C achieves substantially similar protection on the bend as Panel B, no protection for the scribe, but does augment flat surface protection. However, the Panel C coating weight is essentially that of Panel B, thereby showing the unacceptable, deleterious results which are achieved when the coating bath contains an excess of strong acid, leading to significant metal powder dissolution in the coating composition.

Example 3

A coating composition is prepared in accordance with Example 26 of U.S. Pat. 2,777,785 to contain 30 g./l. of $CrO_3$, 15 g./l. cane sugar, and 1 g./l. potassium permanganate, with the balance being distilled water. Panels are cleaned in accordance with the teachings of the above-mentioned Example 26 and one panel (Panel A) is coated in accordance with the procedures of the Example 26 to prepare a panel for comparative testing purposes.

The coating for Panel A is again prepared but is formulated to include 200 g./l. of powderetd zinc having an average particle size of 3 microns. A panel (Panel B) is prepared by dipping into this composition, removing the panel and draining excess composition from the panel, and baking under infrared lamps to a temperature of 250° F. The panel has an average coating weight of about 230–240 mgs. per sq. ft. Another panel (Panel C) is prepared in the same manner as Panel A but after the panel is removed from the aqueous coating solution it is sprayed with an aqueous slurry of 200 g./l. of the powdered zinc and 0.3 g./l. of lignin sulfonic acid dispersing compound. The panel is then heated at a temperature to 250° F. under infrared lamps at a sufficient time to prepare a water insoluble coating. The panel has a total coating weight of 150–200 mgs. per sq. ft. Panels B and C are thus prepared in a manner upgrading the coating composition for Panel A in accordance with invention principles, although such panels should be topcoated for extended corrosion protection.

As shown in Table 3 below, panels are bent 180° before testing and are then subjected to the salt spray test for a time shown in the table. The figures presented in Table 3 are for percentage of red rust on the panel at the bend and on the flat surface for the duration of the test time shown.

TABLE 3

| Panel | Zinc | Salt spray results | |
|---|---|---|---|
| | | Bend | Flat surface |
| A-comp | No | 100%—2 hrs | 98%—19 hrs. |
| B | Yes | 100%—17 hrs | 25%—17 hrs. |
| C | Yes | 90%—19 hrs | <1%—19 hrs. |

NOTE.—Comp.=Comparative panel.

The tabular results show that the comparative Panel A offers virtually no corrosion protection while the addition of pulverulent metal in the coating bath provides, comparatively, for an excellent enhancement in such protection, i.e., as seen from the results of Panel B. This enhancement is further evidenced by Panel C, where the pulverulent metal has been spray applied, and such results additionally indicate that spray application for such composition is ostensibly preferable. However, the results also confirm that for desirably extended corrosion protection the coating should contain greater than about 200 mgs. per sq. ft. of pulverulent metal.

Example 4

Panels are prepared for coating as described hereinbefore and one panel (Panel A) is coated with the formulation shown in Example II of U.S. Pat. 3,053,702. The coating composition contains 84 cc. of a 46 percent solids dispersion of butadiene-styrene resin, 1.2 grams of p-octyl phenyl triethylene oxyethanol, 11.2 grams of sucrose, 37.5 grams of a 36 percent dispersion of $TiO_2$ in water, 60 cc. of anaqueous zinc dichromate solution containing ¾ gram dichromate measured as $CrO_3$ per cc., 60 grams of powdered zinc having an average particle size of 3 microns, and all diluted to 600 cc.

The panel is coated by rolling through rubber rolls wetted with the flooded solution. The coated panel is cured under infrared lights at a metal temperature of between 350°–400° F. and the resulting coating weight is about 100–120 milligrams per square foot. This panel is prepared for comparative testing only.

Another panel (Panel B) is prepared from the panel coating composition, and in the manner of coating, of Panel A, except that the coating composition contains water in place of the 84 cc. of the butadiene-styrene resin dispersion. This panel is cured at 350–400° F. and exhibits a coating weight of about 100–120 milligrams per square foot. This panel is prepared for comparative purposes since the coating composition contains only 100 grams per liter of pulverulent metal and the coating contains a very low amount of such metal.

An additional panel (Panel C) is coated in the manner of coating Panel A but the coating composition is modified with respect to the resin, the zinc dichromate, and the powdered zinc. More specifically the coating composition replaces the 84 cc. of resin with water, replaces the 60 cc. of zinc dichromate solution with chromic acid, and boosts the powdered zinc from 60 grams to 400 grams per liter. The coated panel is cured under infrared lamps at a metal temperature reaching 350° F. and the coated panel displays a coating weight of about 300–330 milligrams per square foot. This panel is prepared in accordance with invention principles.

In Table 4 below results are shown for the salt spray test for the time shown in the table and the figures presented are for percentage of red rust on the panel. Before testing, panels are bent 180° and are also scribed, in the manner described hereinbefore.

TABLE 4

| Panel | Zinc | Resin | Salt spray results | | |
|---|---|---|---|---|---|
| | | | Bend | Scribe | Flat surface |
| A-comp | Yes | Yes | 70%—21 hrs | 100%—21 hrs | 5%—21 hrs |
| B-comp | Yes | No | 90%—21 hrs | 40%—21 hrs | 10%—21 hrs |
| C | Yes | No | 30%—87 hrs | 5%—87 hrs | 2%—87 hrs |

NOTE.—Comp.=Comparative panel.

The above tabulated results shown that the Panel A composition containing 64.5 grams per liter of resin provides little protection. Simply omitting the resin, therefore changing to a chromium bonding of the coating for Panel B, provides for little difference in the bend and flat surface protection. However, the chromium bonding in Panel B, even outside the threshold of enhanced protection as described hereinabove, will still begin to achieve scribe protection not afforded by the resin-bonded comparative Panel A.

The Panel C protection from the composition containing 400 grams per liter of pulverulent zinc and which is resin-free and therefore prepared in accordance with invention principles, is desirably augmented protection at the bend, scribe and on the flat surface. Comparison of this Panel C containing 300–330 milligrams per square foot of coating, with Panel C of Example 2, which panel contains about 350 milligrams per square foot of coating from a composition that contains 30 percent powdered metal, further discloses how significant amounts of strong acids, as are present in the Example 2 Panel C composition, cannot be tolerated in the coating compositions of the present invention.

Example 5

Test panels are prepared as described above and are coated with the C/S coating composition described in Example 1 except that the dispersing agent is a liquid non-ionic polyethoxy polyether. Panels are coated as described in Example 1 and, as shown in the table below, some panels are cured at 475° F. and others at 300° F. After cooling, all panels are coated with a zinc-rich primer having at first a weight per gallon of 23.1 pounds, an initial solids volume of 50 percent, and containing initially 84.5 weight percent of non-volatiles. Prior to use, this primer is reduced to a viscosity of 45 seconds as measured on a No. 4 Ford Cup with an aromatic solvent prepared synthetically from petroleum and having a flash point of 145°–150° F. Primer coated panels are cured at 475° F. and exhibit a total coating thickness of about 0.5 mil which is virtually equivalent to the primer coating thickness. Before application of the primer, analysis shows that the undercoated panels cured at 475° F. contain 30 milligrams per square foot (mgms./ft.$^2$) of chromium and such panels cured at 300° F. contain 36 mgms./ft.$^2$ of chromium.

Additional panels prepared as described above are coated with a composition containing 30 g./l. of $CrO_3$, 262.5 g./l. of powdered zinc having average particle size of 3 microns, 5 g./l. of succinic acid, 2.5 g./l. of succinimide, 1 g./l. of a dispersing agent, which is a heteropolysaccharide prepared from the bacteria species *Xanthomonas campestris* and has a molecular weight in excess of 200,000 and recurring units of D-glucose, D-mannose, and a potassium salt of D-glucuronic acid in a ratio of 2.8:3.0:2.0, and about 0.5 g./l. of the above-described dispersing agent. Panels are coated as described above and cured at a temperature of 450° F. and are shown by analysis to contain 40 mgms./ft.$^2$ of chromium as well as 443 mgms./ft.$^2$ of powdered zinc. Panels are coated with the zinc-rich primer described hereinabove and are curced at 450° F. thereafter displaying a primer film thickness of about 0.3 mil.

Additional panels, prepared as described above and coated with the above-described coating composition containing the powdered zinc, are cured at 475° F. Some of the panels on analysis show 33 mgms./ft.$^2$ of chromium plus 375 mgms./ft.$^2$ of powdered zinc, and the balance show 43 mgms./ft.$^2$ of chromium and 450 mgms./ft.$^2$ of the zinc. All panels are coated with the primer described hereinbefore and are thereafter cured at 475° F. The panels containing the 33 mgms./ft.$^2$ of chromium have a primer thickness of about 0.5 mil and a total coating thickness of about 0.6 and the balance have a primer thickness of about 0.75 mil.

As shown in the table below, the panels prepared as described above are subjected to electrical resistance spot welding as has been described in Example 1. For the panels passing the test, the test proceeds through 2000 spot welds, but as shown in the table below, those panels failing the test do not successfully complete this extended welding.

TABLE 5

| Undercoat chromium,[1] mgms./ft.$^2$ | Undercoat zinc, mgms./ft.$^2$ | Cure temp., °F. | Topcoat thickness, in mils | Elec. resis. spot welds | | |
|---|---|---|---|---|---|---|
| | | | | No. | Misfires [2] | Button dia. at 2,000 |
| 30 | None | 475 | 0.5 | 100 | 22 | N.A. |
| 36 | None | 300 | 0.5 | 502 | 8 | N.A. |
| 40 | 443 | 450 | 0.3 | 2,000 | None | 0.226" |
| 33 | 375 | 475 | 0.5 | 2,000 | None | 0.245" |
| 43 | 450 | 475 | 0.75 | 2,000 | None | 0.265" |

[1] Expressed as chromium and not $CrO_3$.
[2] No weld achieved although panel goes through weld cycle.
NOTE.—N.A.=Not available; test terminated earlier as failed.

As is seen from the above table, the panels containing the powdered-zinc-free undercoating and the 0.5 mil topcoating of the zinc-rich primer, do not pass the electrical resistance spot welding test. This failure is attributed to the lack of pulverulent metal in the undercoating coupled with an elevated chromium weight above about 25 mgms./ft.$^2$ of chromium, below which, such combinations can have extended weldability. Comparatively, the panels containing the pulverulent-zinc-containing undercoating, containing 33–43 mgms./ft.$^2$ of chromium in the undercoating and having a zinc-rich primer topcoating of 0.3 to 0.75 mil thickness all readily pass the electrical resistance spot welding test. Such panels can be welded, without misfire, through the 2000 spots and even for the elevated concentration of more than 40 mgms./ft.$^2$ of chromium in the undercoating.

Example 6

Test panels are prepared as described above and a panel (A) is coated with the C/S composition of Example 1 in the manner of Example 1 and after drying is baked under infrared lamps at a substrate temperature reaching 450° F. An additional panel (B) is coated with a composition containing 40 g./l. $CrO_3$, 350 g./l. of powdered zinc having average particle size of 3 microns, 5 g./l. of succinic acid, 2.5 g./l. of succinimide, and 1 g./l. of heteropolysaccharide dispersing agent. The panel is coated in the above-described manner and cured at a temperature of 450° F. and is shown by analysis to contain about 55 mgms./ft.$^2$ of chromium and about 570 mgms./ft.$^2$ of powdered zinc.

An additional panel (C) is coated with the powdered-zinc-containing undercoating composition described in Example 5 and in the manner of Example 5. This panel contains in the undercoating 50 mgms./ft.² of coated substrate surface of chromium and 513 mgms./ft.² of powdered zinc. Additional panels (D), are coated over bare steel with the zinc-rich primer described in Example 5 in the manner of Example 5 to exhibit a primer coating thickness of 0.15 mil, 0.36 mil, and 0.50 mil thickness, respectively.

Further panels (E) prepared as described above are coated with the powdered-zinc-containing composition disclosed in Example 5 and in the manner of Example 5 and are further topcoated with the zinc-rich primer topcoating as described therein. Panels contain 0.15 mil, 0.36 mil, and 0.50 mil thickness of the primer topcoat, respectively. Additionally, the panel containing the 0.15 mil topcoat contains 34 mgms./ft.² of chromium and 369 mgms./ft.² of zinc in the undercoating. The panel containing the 0.36 mil of topcoat contains in the undercoating 33 mgms./ft.² of chromium and 269 mgms./ft.² of coated substrate surface of zinc, and the panel containing 0.50 mil thickness of primer contains in the undercoating 33 mgms./ft.² of chromium and 363 mgms./ft.² of powdered zinc.

All panels are then coated with a black-pigment electrocoat primer containing at first 40 percent of non-volatiles which before use is reduced with deionized water in the proportion of 1 part by volume paint to 3 parts by volume water. Panels are immersed in the electrocoat paint bath as anodes and paint is applied typically for 2 minutes at 90 volts. Following removal of the panels from the electrocoating bath, all panels are baked for 20 minutes at a temperature of 425° F. After baking, all panels are scribed as described hereinabove and are subjected to the corrosion resistance test also as described hereinbefore. In the table below the results of such corrosion resistance testing are shown. The results of such testing are presented as inches of failure of paint adhesion, to the nearest 1/32 of an inch, away from the scribe lines, as well as visual observation of the surface.

TABLE 6

| Panel | Zinc in undercoat, mgms./ft.² | Primer thickness, in mils | Salt spray, 120 hours | |
|---|---|---|---|---|
| | | | Scribe | Face |
| A | No zinc | No primer | ¹ CLA | CLA |
| B | 570 | do | ¹ 0.5-1.0/32 | O.K. |
| C | 513 | do | 0.5/32 | O.K. |
| D | No undercoat | 0.15 | 1.5/32 | #7, F ² |
| | | 0.36 | 2/32 | #8, F |
| | | 0.50 | 2.5-3.5/32 | #8, F |
| E | 369 | 0.15 | 0/32 | O.K. |
| | 269 | 0.36 | 0/32 | O.K. |
| | 363 | 0.50 | 0/32 | O.K. |

¹ 240 hours salt spray.
² Numbers refer to blisters in accordance with ASTM D 714-56, and F=Few.
NOTE.—CLA=Complete loss of paint adhesion.

As can be seen from the above results, the pulverulent-metal-free undercoating alone, Panel A, offers no adhesion for electrodeposited paint subjected to the corrosion resistance test. Further, the zinc-rich primer over the bare metal surface which is subsequently electrocoated, even at a thickness as great as 0.5 mil for the primer, offers poor corrosion resistance along the scribe lines in salt spray testing.

The other electrocoated panels, that is, Panels B and C containing the pulverulent-metal-containing undercoating, or the panels E having the undercoating which is subsequently primer coated with the zinc-rich primer before electrocoating, display excellent corrosion resistance and thus electrodeposited film adhesion both along scribe lines and on panel faces in the salt spray test. These coatings of the powdered metal containing undercoating or such undercoating subsequently topcoated with zinch-rich primer, offer highly desirable coated metal substrates for subsequent deposition of electrocoating paint.

We claim:

1. A coating composition for application to, and curing on, a metal substrate, thereby preparing an adherent, water insoluble, and corrosion resistant coating on said substrate, which composition is substantially resin free and before curing comprises an intimate mixture in liquid medium of:

(A) a hexavalent-chromium-providing substance;
(B) reducing agent for said substance;
(C) 200–1,000 grams per liter of liquid medium of pulverulent metal selected from the group consisting of zinc, manganese, aluminum, magnesium, mixtures thereof, and alloys of same, said composition having a weight ratio of chromium, expressed as $CrO_3$, to pulverulent metal of not substantially less than 0.08:1; and
(D) not substantially above about 5 weight percent, based on the weight of pulverulent-metal-free composition, of agents selected from the group consisting of dispersing agents, suspending agents, defoaming agents, wetting agents, extending agents, and mixtures thereof.

2. The coating composition of claim 1 wherein said liquid medium contains 0–40 grams per liter of resin, 0–40 grams per liter of pigment, and 0–40 grams per liter of bath extending agent, and phosphate compounds in an amount supplying not above about 15 grams per liter.

3. The coating composition of claim 1 containing from about 40 to 100 grams per liter of liquid medium of chromium, expressed as $CrO_3$ and not substantially above about 20 grams per liter of metallic ions.

4. The composition of claim 1 wherein said hexavalent-chromium-providing substance is supplied substantially by chromic acid, the major portion of the liquid of said medium is selected from the group consisting of water and t-butanol, and said pulverulent metal is selected from the group consisting of zinc, aluminum, mixtures thereof, and alloys of same.

5. The composition of claim 1 further characterized by the ingredients being combined into said coating composition from two separate packages, one of which contains said (A) substance and said (B) substance, and the other contains pulverulent metal and at least the major amount of said (D) components.

6. The composition of claim 5 wherein the pulverulent-metal-containing package contains up to about 90 weight percent of pulverulent zinc.

7. A coated metal substrate having on the surface thereof an adherent, corrosion resistant and substantially resin-free and water-insoluble coating, which coating comprises from about 50 to about 5,000 milligrams per square foot of coated substrate of pulverulent metal selected from the group consisting of zinc, aluminum, manganese, magnesium, mixtures thereof, and alloys of same in intimate mixture with the residue from a substantially resin-free hexavalent-chromium-containing coating composition containing a hexavalent-chromium-providing substance and reducing agent thereof in liquid medium, said coating composition providing said residue with from about 10 to about 500 milligrams per square foot of coated substrate of chromium, wherein said coating contains a weight ratio of chromium to pulverulent metal not substantially above about 0.3:1, and said residue is obtained by applying to said metal surface said hexavalent-chromium-containing composition and heating said substrate at a temperature, and for a period of time, sufficient to vaporize volatile substituents from said coating composition and deposit on said surface said residue.

8. The coated metal substrate of claim 7 wherein said coating composition contains 0–40 grams per liter of resin, 0–40 grams per liter of pigment, 0–40 grams per liter of bath extending agents, and phosphate compounds in an amount supplying not above about 15 grams per liter.

9. The coated metal substrate of claim 7 containing from about 50 to about 200 milligrams per square foot of pulverulent metal and about 10 to about 35 milligrams per square foot of chromium, said coated metal substrate being further topcoated.

10. The coated metal substrate of claim 7 wherein said residue is the residue remaining after heating applied coating at a temperature not substantially above about 1000° F. and for a time of at least about 0.25 second.

11. The method of preparing a coated metal substrate having on the surface thereof an adherent, corrosion resistant and substantially resin-free and water insoluble coating, which method comprises:
   (1) applying to said surface a substantially resin-free hexavalent-chromium-containing coating composition containing a hexavalent-chromium-providing substance and reducing agent therefor, in liquid medium, and in an amount sufficient to provide from about 10 to about 500 milligrams per square foot of coated substrate of chromium;
   (2) applying to said surface pulverulent metal selected from the group consisting of zinc, aluminum, manganese, magnesium, mixtures thereof, and alloys of same in sufficient amount to provide from about 50 to about 5000 milligrams per square foot of coated substrate of said pulverulent metal and to provide said coating with a weight ratio of chromium to pulverulent metal not substantially above about 0.3:1; and
   (3) heating said substrate at a temperature, and for a period of time, sufficient to vaporize volatile substituents from said coating composition and deposit on said surface said coating.

12. The method of claim 11 wherein said pulverulent metal is applied to said surface after the application of said coating composition and said substrate is heated at a substrate temperature not substantially above about 1000° F. and for a time of at least about 0.25 second.

13. The method of claim 11 wherein said pulverulent metal is applied to said surface as part of said coating composition and in an amount sufficient to provide from about 50 to about 200 milligrams per square foot of said pulverulent metal, said coating composition further providing from about 10 to about 35 milligrams per square foot of chromium, and said coated metal substrate is subsequently topcoated.

14. The method of electrical resistance welding metallic articles which comprises:
   (1) establishing on at least one article, and on at least a portion of the surface of said article where welding will take place, from about 50 to about 5000 milligrams per square foot of coated substrate of pulverulent metal selected from the group consisting of zinc, aluminum, manganese, magnesium, mixtures thereof, and alloys of same in intimate mixture with the residue from a substantially resin-free hexavalent - chromium - containing coating composition containing a hexavalent - chromium - providing substance and reducing agent therefor, in liquid medium, said residue being in an amount sufficient to provide said coating with from about 10 to about 120 milligrams per square foot of coated substrate of chromium, and to further provide said coating with a weight ratio of chromium to pulverulent metal not substantially above about 0.3:1;
   (2) heating said substrate at a temperature and for a period of time sufficient to vaporize volatile substituents from said coating composition and deposit on said surface a substantially water insoluble and resin-free coating of said residue and pulverulent metal, said coating providing corrosion resistance and weldable electroconductivity thereon;
   (3) contacting at least a portion of said one article with another article of metal to be welded;
   (4) passing an electrical resistance welding current through said articles of metal and said coating thereon at the zone selected for welding; and
   (5) fusing said articles together in said zone of said welding.

15. The method of preparing a weldable substrate for electrical resistance welding and having desirable corrosion resistance, which method comprises:
   (1) establishing on the surface of said substrate, on at least a portion thereof where welding will take place, from about 50 to about 5,000 milligrams per square foot of coated substrate of pulverulent metal selected from the group consisting of zinc, aluminum, manganese, magnesium, mixtures thereof, and alloys of same, in intimate mixture with the residue from a substantially resin-free hexavalent-chromium-containing coating composition containing a hexavalent chromium-providing substance and reducing agent therefor, and liquid medium, said residue being in an amount sufficient to provide said coating with from about 10 to about 120 milligrams per square foot of coated substrate of chromium, and to further provide said coating with a weight ratio of chromium to pulverulent metal not substantially above about 0.3:1, thereby establishing a treated metal surface;
   (2) establishing on the resulting treated metal surface a topcoat composition comprising a particulate, electrically conductive pigment in a vehicle, wherein said electrically conductive pigment is selected from the group consisting of aluminum, copper, cadmium, steel, magnetite, carbon, and zinc; and
   (3) curing said topcoat composition thereby preparing said substrate for welding with a coating providing corrosion resistance and weldable electroconductivity.

16. The method of claim 15 wherein said topcoat is at least in part established by applying a topcoat composition providing a cured film thickness not substantially above about 1.0 mil, said composition containing between about 30–80 volume percent of zinc pigment in admixture with a vehicle comprising a material selected from the group consisting of polystyrene, chlorinated rubber, isomerized rubber, polyvinyl acetate, epoxy resin, polyamide resin combined with epoxy resin and polyvinyl chloride-polyvinyl acetate copolymers.

17. The method of claim 15 wherein said treated metal surface has above about 20 milligrams per square foot of chromium and said substrate after establishing said topcoat composition thereon is heated at a temperature not substantially in excess of about 1000° F. and for a time of at least about 0.5 minute.

18. A weldable metal substrate prepared for electrical resistance welding according to the method of claim 15.

19. The method of electrical resistance welding metallic articles which comprises:
   (1) establishing on at least one article, and on at least a portion of the surface of said article, where welding will take place, from about 50 to about 5,000 milligrams per square foot of coated substrate of pulverulent metal selected from the group consisting of zinc, aluminum, manganese, magnesium, mixtures thereof, and alloys of same, in intimate mixture with the residue from a substantially resin-free hexavalent - chromium - containing coating composition containing a hexavalent - chromium - providing substance and reducing agent therefor, and liquid medium, said residue being in an amount sufficient to provide said coating with from about 10 to about 120 milligrams per square foot of coated substrate of chromium, and to further provide said coating with a weight ratio of chromium to pulverulent metal not substantially above about 0.3:1, thereby establishing a treated metal surface;
   (2) establishing on the resulting treated metal surface a topcoat composition comprising a particulate, electrically conductive pigment in a vehicle, wherein said electrically conductive pigment is selected from the group consisting of aluminum, copper, cadmium, steel, magnetite, carbon, and zinc;

23

(3) curing said topcoat composition thereby preparing said substrate for welding with a coating providing corrosion resistance and weldable electroconductivity;
(4) contacting at least a portion of said one article with another article of metal to be welded;
(5) passing an electrical resistance welding current through said articles of metal and caid coating thereon at the zone selected for welding; and
(6) fusing said articles together in said zone of said welding.

20. A welded article prepared according to the method of claim 19.

21. The method of preparing a substrate for receiving a deposition of electrocoat paint, which method comprises:
(1) applying to said surface a substantially resin-free hexavalent-chromium-containing coating composition containing a hexavalent-chromium-providing substance and reducing agent therefor, in liquid medium, and in an amount sufficient to provide for about 10 to about 500 milligrams per square foot of coated substrate of chromium;
(2) applying to said surface pulverulent metal selected from the group consisting of zinc, aluminum, manganese, magnesium, mixtures thereof, and alloys of same in sufficient amount to provide from about 50 to about 5000 milligrams per square foot of coated substrate of said pulverulent metal and to provide said coating with a weight ratio of chromium to pulverulent metal not substantially above about 0.3:1; and
(3) heating said substrate at a temperature and for a period of time sufficient to vaporize volatile substituents from said coating composition and deposit on said surface a substantially water insoluble and resin-free coating of said residue and pulverulent metal, said coating providing electroconductivity for deposition of electrocoat paint thereon.

22. The method of applying electrocoat paint to a substrate treated to receive the deposition of such paint, which method comprises:
(1) applying to said surface a substantially resin-free hexavalent-chromium-containing coating composition containing a hexavalent-chromium-providing substance and reducing agent therefor, in liquid medium, and in an amount sufficient to provide from about 10 to about 500 milligrams per square foot of coated substrate of chromium;
(2) applying to said surface pulverulent metal selected from the group consisting of zinc, aluminum, manganese, magnesium, mixtures thereof, and alloys of same in sufficient amount to provide from about 50 to about 5000 milligrams per square foot of coated substrate of said pulverulent metal and to provide said coating with a weight ratio of chromium to pulverulent metal not substantially above about 0.3:1;
(3) heating said substrate at a temperature and for a period of time sufficient to vaporize volatile substituents from said coating composition and deposit on said surface a substantially water insoluble and resin-free coating of said residue and pulverulent metal, said coating providing electroconductivity on said substrate and thereby establishing a treated surface;
(4) immersing into a bath of electrocoat paint containing an electrode the resulting treated surface and preparing same as an electrode; and
(5) electrolyzing said bath of electrocoat paint.

23. An electrocoated article prepared by the process of claim 22.

24. The method of preparing a corrosion resistant, welded metal assembly having an electrocoat painted surface which method comprises:
(1) establishing, before welding, on the surface of at least one article for welding, and on at least a portion of the article surface where welding will take place, from about 50 to about 5,000 milligrams per square foot of coated substrate of pulverulent metal selected from the group consisting of zinc, aluminum, manganese, magnesium, mixtures thereof, and alloys of same, in intimate mixture with the residue from a substantially resin-free hexavalent-chromium-containing coating composition containing a hexavalent-chromium-providing substance and reducing agent therefor, and liquid medium, said residue being in an amount sufficient to provide said coating with from about 10 to about 120 milligrams per square foot of coated substrate of chromium, and to further provide said coating with a weight ratio of chromium to pulverulent metal not substantially above about 0.3:1, thereby establishing a treated metal surface;
(2) establishing on the resulting treated metal surface a topcoat composition comprising a particulate, electrically conductive pigment in a vehicle, wherein said electrically conductive pigment is selected from the group consisting of aluminum, copper, cadmium, steel, magnetite, carbon, and zinc;
(3) curing said topcoat composition thereby preparing said substrate for welding with a coating providing corrosion resistance and weldable electroconductivity;
(4) contacting at least a portion of the article having the prepared substrate with another article of metal to be welded;
(5) passing an electrical resistance welding current through said articles of metal and said coating thereon at the zone selected for welding, and fusing said articles together at said zone of welding, thereby forming said welded metal assembly;
(6) immersing into a bath of electrocoat paint containing an electrode the resulting assembly and preparing same as an electrode; and
(7) electrolyzing said bath of electrocoat paint.

25. A welded and electrocoated assembly prepared by the process of claim 24.

References Cited

UNITED STATES PATENTS

| | | | |
|---|---|---|---|
| 3,318,716 | 5/1967 | Schuster et al. | 148—6.2 X |
| 3,351,504 | 11/1967 | DeHart | 148—6.2 X |
| 3,502,511 | 3/1970 | Forsberg | 148—6.15 R |
| 3,454,483 | 7/1969 | Freeman | 148—6.15 R X |
| 3,325,432 | 6/1967 | Kellert et al. | 148—6.2 X |
| 2,662,838 | 12/1953 | Oven | 148—6.16 |
| 3,462,319 | 8/1969 | Campbell | 148—6.16 |
| 3,248,251 | 4/1966 | Allen | 148—6.16 |
| 2,768,104 | 10/1956 | Schuster et al. | 148—6.16 |
| 2,911,332 | 11/1959 | Schuster et al. | 148—6.2 |
| 3,053,702 | 9/1962 | Schuster et al. | 148—6.2 |

RALPH S. KENDALL, Primary Examiner

U.S. Cl. X.R.

29—196, 488; 117—71, 75; 148—6.16, 31.5; 204—181